United States Patent [19]

Cogswell

[11] 4,143,568

[45] Mar. 13, 1979

[54] ROTARY WEB CUTTING APPARATUS

[75] Inventor: John Cogswell, Medfield, Mass.

[73] Assignee: Butler-Automatic, Inc., Canton, Mass.

[21] Appl. No.: 811,621

[22] Filed: Jun. 30, 1977

[51] Int. Cl.[2] .................... B23D 5/12

[52] U.S. Cl. .................... 83/116; 83/344; 83/346; 83/348; 83/542

[58] Field of Search .................... 83/116, 117, 154, 346, 83/348, 309, 345, 678, 542, 674, 663, 344, 166

[56] References Cited

U.S. PATENT DOCUMENTS

| | | | |
|---|---|---|---|
| 1,185,761 | 6/1916 | Bewsic | 83/344 |
| 2,870,840 | 1/1959 | Kwitek | 83/678 X |
| 3,056,323 | 10/1962 | Kwitek | 83/348 X |
| 3,555,948 | 1/1971 | Olson | 83/346 X |

*Primary Examiner*—J. M. Meister

*Attorney, Agent, or Firm*—Cesari and McKenna

[57] ABSTRACT

Web cutting apparatus employs a rotary knife cylinder with elongated, radially outwardly projecting knife blade assemblies spaced around its periphery. A rotary anvil cylinder spaced parallel to the knife cylinder carries a corresponding peripheral array of elongated anvils. When the two cylinders rotate, the knife blades bear against the anvils at the nip between the two cylinders. The knife blade assemblies are flexible and resilient so that each blade edge is biased against its anvil at the instant of interference, with a local force sufficient to cut web. Further, the natural frequency of the knife assemblies is selected to be considerably higher than those of the other machine parts so that the spacing between the knife blades and the anvils at the nip is substantially unaffected by vibrations of those parts. Also the apparatus efficiently removes trim strips produced by the web cuts.

7 Claims, 2 Drawing Figures

ROTARY WEB CUTTING APPARATUS

BACKGROUND OF THE INVENTION

This invention relates to web cutting apparatus. It relates more particularly to cutting apparatus of the rotary type for cutting webs such as paper and the like transversely of the path of web travel.

Rotary knives have been used for many years to effect transverse cuts in moving webs including multi-ply and folded sheets. Such knives include an elongated rotary cylinder which supports an array of elongated radially outwardly projecting, longitudinally extending knife blades spaced apart around the periphery of the cylinder. The circumferential spacing of such blades determines the lengths of the sheets severed from the moving web.

Spaced parallel to the knife cylinder is an anvil cylinder. The rotary motion of the two cylinders brings the knife blades into the nip between the two cylinders, in turn, to effect cuts in the web moving through the nip. In many instances, provision is made in the apparatus for permitting the knife blades and anvils to be removed or adjustably positioned to cut different length sheets from the web and thereby accommodate the particular repeat pattern of printed material on the web. Rotary cutters such as this are disclosed, for example, in U.S. Pat. Nos. 3,555,948; 3,073,196; and 3,111,875.

In conventional rotary cutters, there is a tedious and time consuming "rolling in" process whereby the heights of the knife blades on the knife cylinder are adjusted to obtain the required amount of interference with the anvil cylinders to cut the web. Typically the knife blades are bolted along their lengths to fixtures mounted on the knife cylinder. The rolling in process involves an initial torquing of the blade-securing bolts with the blades set high and then advancing each knife blade into the nip so that it is displaced by the anvil to the point where its edge just kisses the corresponding surface of the anvil. The initial torque should provide sufficient resistance such that the blade is pushed away by the anvil only by the amount required to obtain the desired interference with the anvil. Then the bolts are tightened to maintain that blade setting. If the initial torquing operation is done just right, the desired amount of interference, typically only a few ten thousandths of an inch, is obtained. However, it takes a certain knack or skill to provide just the right amount of pretorque in a given case. More often than not the process has to be repeated more than once for each blade before the cutter is ready to operate.

If a particular knife blade has not been correctly positioned and is too close to its anvil during normal operation, the blade edge bears against the anvil with excessive force and becomes dull relatively quickly. As a result, the cutter has to be shut down relatively frequently while the blades are sharpened or replaced. On the other hand, if a blade is not close enough to its anvil in the nip between the two cylinders, the force developed at the instant of interference is less than that required to sever the web, e.g. 400-600 lbs. per lateral inch in the case of paper web. Resultantly, the apparatus does not cut the travelling web reliably, thereby causing downstream web-handling problems. Also the very fact that an interference between the knife and anvil is required to produce the force to cut the web produces problems in some applications. More particularly at the instant of interference, inherently the machine frame or the cylinders themselves are stressed and distorted. Therefore when the cutter is set up with its knife blades arranged close together, say, in closely spaced pairs to remove "bleed trims" between successive panels to be cut from the web, the parts distortions caused by the first blade interfering with its anvil persist long enough to upset the spatial relationship between the second blade and its anvil when that blade is rotated into the nip. As a result, the second cut is often defective, so that the bleed trim is not removed, or even worse, the partially severed trim strip, impaled on the usual strip removal pins, carries the leading edge of the web around the knife cylinder so that the apparatus has to be shut down.

Furthermore, even if all of the knife blades are properly rolled in, excessive wear and cutting problems can still arise because the machine parts have natural frequencies of vibration at certain machine speeds which often cause relative movement between the knife cylinder and the anvil cylinder that changes the interference between the knife edges and the anvils. At one instant, when a knife is opposite its anvil, the two may be moving toward one another so that the knife interferes too much with the anvil resulting in excessive blade wear. At another instant, the two cylinders may be moving away from one another so that a particular blade does not interfere enough with its anvil and the web is only partially cut. Thus as the cutter and other equipment in the line including the press are being brought up to speed, often one or another of these machine resonances is encountered which upsets the knife-anvil interference with the aforesaid consequences.

In addition, thermal effects sometimes upset the preset interference between blade and anvil. That is, as the apparatus starts and continues to operate, its various bearings and moving members heat up. This heat causes expansions of the machine frame elements and the cylinders which change the cylinder center-to-center distance. Resultantly, even if the blade is set correctly, in time the interference may increase to the point of becoming destructive to the blade edge or it may decrease so that the web is not severed correctly.

Further, in rotary cutters of this general type some provision must be made for removing trim strips or bleed trims that result from closely spaced transverse cuts in the web. Conventionally this has been done by providing a lengthwise series of ports in the knife cylinder between the blades. A vacuum is maintained at the ports as the web is cut to hold the strip. Then a positive pressure is applied to the ports to expell the strip at a location removed from the nip. This arrangement is not reliable enough especially with multiple ply webs. Resultantly some strips are not removed and are carried around the cylinder causing defective cuts. Also the valving and porting required are complex and therefore expensive to implement. Other prior machines use air loaded pins between the blades to eject the strips captured between the blades. Here again poor reliability is a problem.

Still another type apparatus has a perforating rule positioned between the knife blades whose teeth impale the strips and bear against a length of tape on the anvil cylinder at the nip. The strips are removed from the rule mechanically at a location away from the nip. With this arrangement, the type and thickness of the tape against which the rule teeth bear must be varied depending upon the type of web stock and the thickness and number of layers in the web. Therefore it requires a relatively long setup time. Still other cutters impale the trim strips on pins at the nip and then comb the strips from the pins with fixed fingers mounted at a location away from the nip. This arrangement is also complex and costly.

SUMMARY OF THE INVENTION

Accordingly the present invention aims to provide rotary cutting apparatus whose blades can be set to the correct heights in a minimum amount of time and with minimum effort.

A further object of the invention is to provide apparatus of this type which suffers a minimum amount of downtime due to excessive blade wear.

A further object of the invention is to provide a rotary cutter which cuts reliably at all machine speeds.

Yet another object of the invention is to provide rotary web cutting apparatus that can reliably sever and remove bleed trims from single and multiple ply webs.

Still another object is to provide a rotary cutter which can tolerate an unusually large amount of blade-anvil interference without excessive blade wear.

Another object is to provide apparatus of this type which can tolerate heat-induced expansions of its parts.

An additional object is to provide cutting apparatus of this type which disposes of trim strips on a reliable basis.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, the present cutting apparatus includes more or less standard rotary knife and anvil cylinders which are spaced parallel to one another and geared to rotate in opposite directions relative to one another. An array of knife blades and a corresponding array of anvils are adjustably mounted on the respective cylinders, their numbers and angular positions depending upon the desired length of the sheets being cut from the web fed to the rotary cutter. Alternatively, a solid anvil cylinder can be used. However, the knife blade edges are not held rigid on their cylinder as is done conventionally. Rather, the knife blades are made flexible and resilient so as to permit a certain degree of relative to and fro movement between each knife blade edge and its corresponding anvil at the nip between the two cylinders.

During the usual rolling in procedure, each knife blade is set high with its securing bolts relatively lightly torqued. The blades are then moved, in turn, into the nip so that each blade or its fixture is flexed to the extent necessary considering the spring rate of the blade or fixture, to bias each blade edge against its anvil with a force sufficient to cut web, typically 400 to 600 pounds per lateral inch in the case of paper web. However, since the blade edge is deflectable, the pretorquing step is simpler, for if the bolts are torqued too much so that the blade edge remains relatively high, it is simply deflected by its anvil. Resultantly, the required accuracy of the blade setting is less than is the case with conventional cutters. Yet the required minimum force to cut the web is always assured by the spring rate of the blade.

Thus, during normal operation of the rotary cutter, as each blade-anvil pair is rotated into the nip, they interfere with one another causing the blade to flex. Consequently, at the instant of interference, the blade edge and anvil are always urged toward one another with a local force on the order of 400 to 600 lbs. per lateral inch, which is sufficient to sever most single and multiple ply paper webs. Also, since the blade is able to flex, there is less stress and strain on the machine frame as the web is cut than is the case with conventional rotary cutters. By the same token, thermally induced expansions of the machine parts that may change the cylinder center-to-center distance can be accommodated by appropriate flexing of the blade.

In addition, vibration of other machine parts does not upset the desired interferences between the blades and the anvils. This is because the blades each have a natural frequency of vibration which is appreciably higher than those of the other machine parts so that the blades follow the low frequency vibrations of those other parts at all normal machine speeds. The desirable knife-anvil contact is thus maintained in spite of such vibrations and is not speed dependent. At the same time, the vibrations do not appreciably increase the force of such contact. Consequently the knives suffer minimum wear and reliably sever the web fed to the cutter. Therefore the cutter can operate continuously and reliably for a relatively long period.

When the rotary cutter is intended to cut and remove bleed trims, a pair of such blades are closely spaced on the knife cylinder. For the aforesaid reasons, the engagement of the first blade of the pair with its anvil does not upset the engagement of the second blade with its anvil so that the bleed trims are cut reliably.

The reliable removal of the trims from the nip is accomplished by a line of pins spaced along the gap between the blades. At the instant of the cut, these pins pierce through the bleed trims and project into a corresponding line of holes spaced along the anvil that backs up those blades. Thus impaled on the pins, the trim is carried out of the nip. At an appropriate location, a bar mounted on the knife cylinder having teeth projecting between the pins is raised beyond the ends of the pins thereof pushing off the trim strip. The strip is then swept away into a vacuum hood and disposed of.

Of course, the strip removal pins and bar could also be located on the anvil cylinder.

Yet with all of the aforesaid advantages, the cost of the present cutter is not greatly higher than that of present day cutting apparatus that are supposed to perform the same functions.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENT

Figure 1:
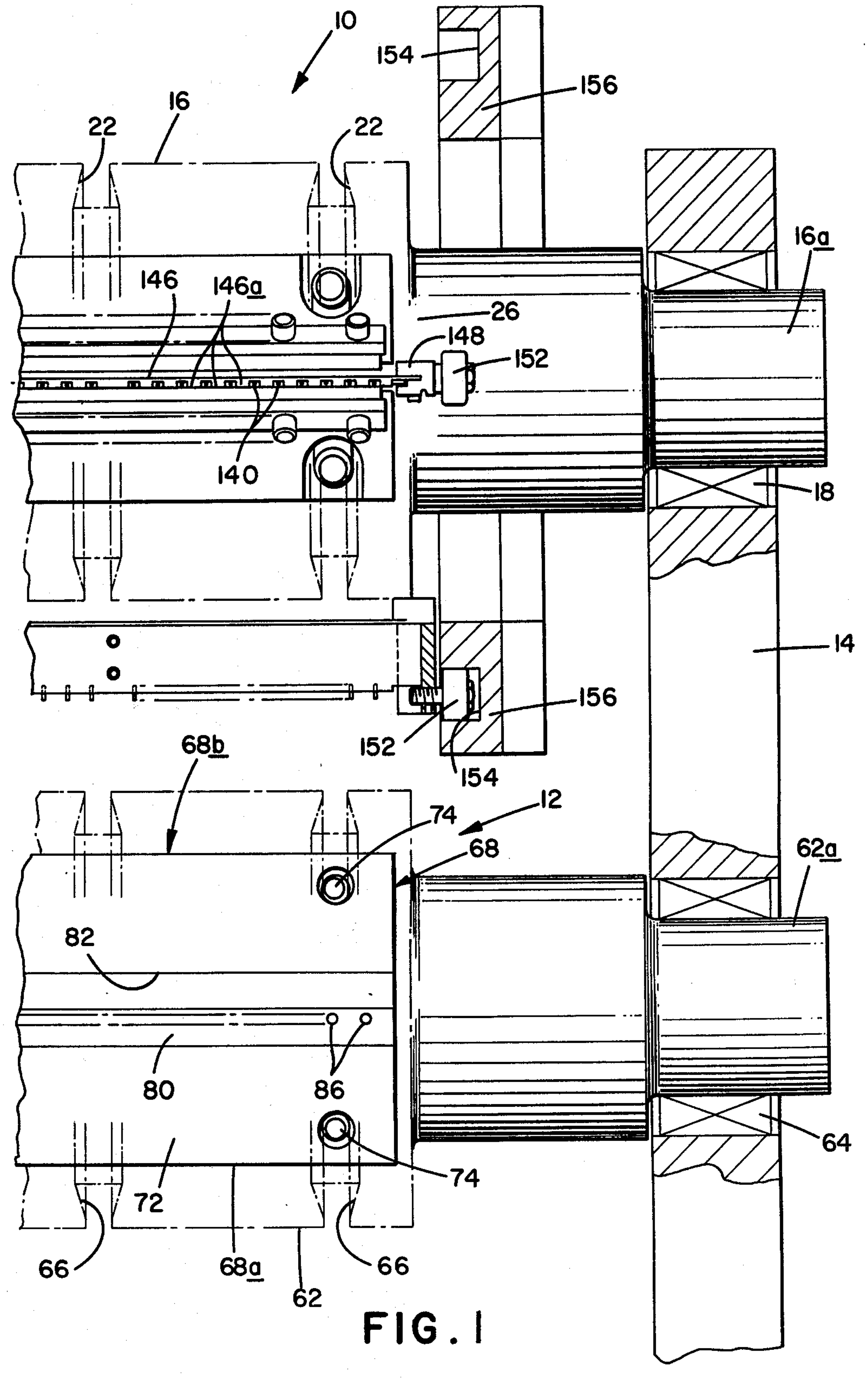
FIG. 1 is a fragmentary view along the direction of web movement with parts shown in section of rotary web cutting apparatus embodying the principles of this invention.
Figure 2:
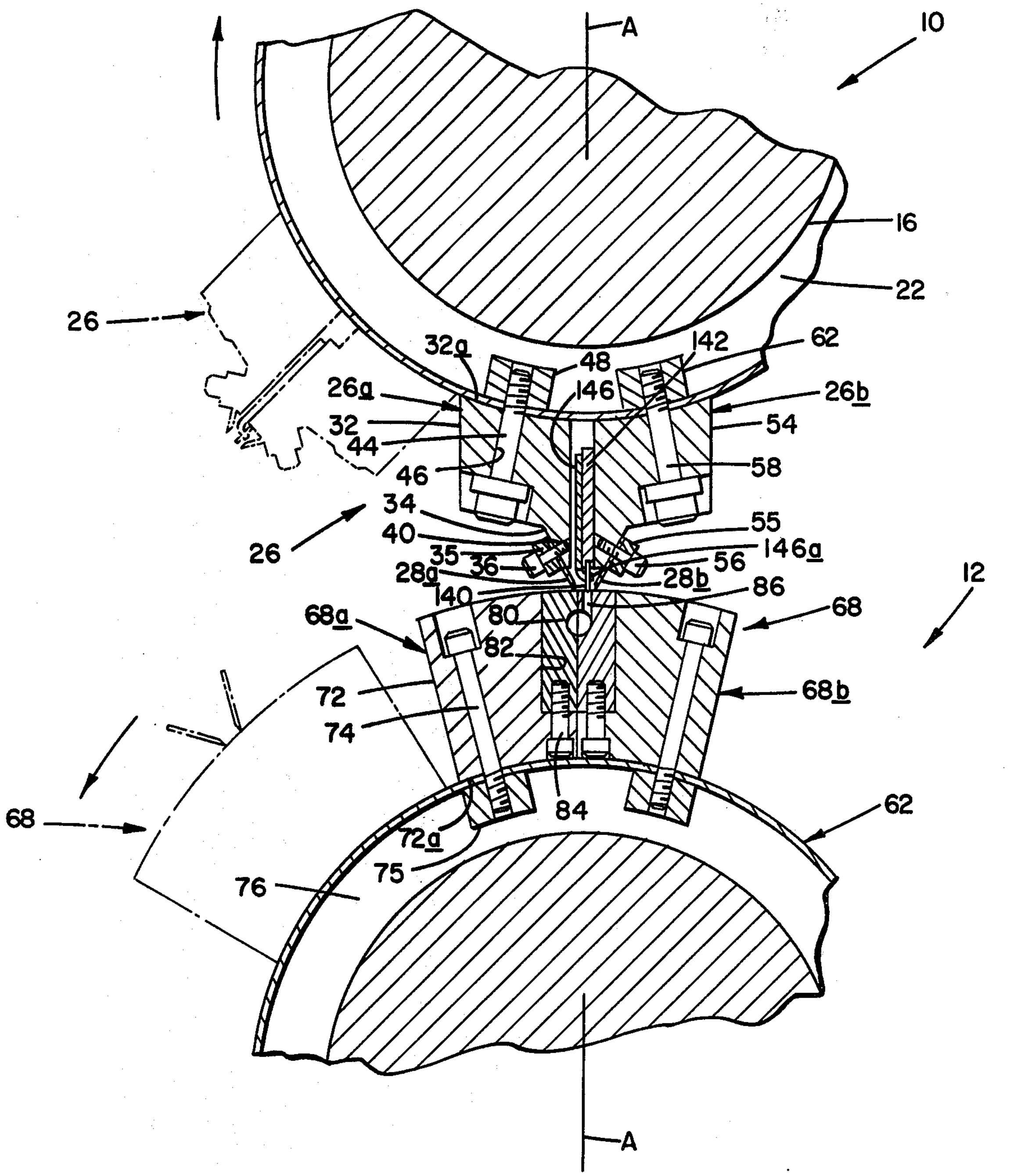
FIG. 2 is a sectional view of the FIG. 1 apparatus.

Referring now to FIGS. 1 and 2 of the drawings, the rotary cutter includes a knife cylinder indicated generally at 10 and an anvil cylinder shown generally at 12. Both cylinders are quite long, typically on the order of three or four feet. For ease of illustration, we have shown only the right hand ends of the cylinders in FIG.

1, the opposite ends being substantially mirror images of the ends shown. The ends of cylinders 10 and 12 are journaled in upstanding end plates 14 only one of which is shown in FIG. 1. These end plates constitute part of the overall machine frame. The cylinders rotate in opposite directions as shown by the arrows in FIG. 2 and are driven in synchronism by any suitable means (not shown).

The knife cylinder 10 includes a cylindrical member 16 having reduced diameter ends 16a journaled by way of bearing units 18 in the side plates 14. The cylindrical member 16 is provided with a series of circumferential, dovetail-shaped keyways 22 on the order of one inch deep spaced along the length of member 16. These keyways are arranged to retain knife assemblies, indicated generally at 26, at spaced apart locations around the circumference of member 16. In the illustrated embodiment, there are eight such assemblies evenly distributed about the knife cylinder.

Also, the illustrated cutter is arranged to remove so-called bleed trims. Therefore, as best seen in FIG. 2, each knife assembly 26 is actually composed of two parts 26a and 26b supporting closely spaced-apart, relatively thin (i.e. 0.060 inch or less), flexible and resilient single bevel knife blades 28a and 28b, although they could just as well have double bevel edges. More particularly, the assembly part 26a comprises a long bar 32 whose undersurface 32a is contoured to conform to the cylindrical member 16. The bar 32 is stepped at 34 to accommodate the knife blade 28a, which extends parallel to member 16. The step 34 is dimensioned and shaped so that when the blade is seated it has appreciable free length and has a rake to facilitate its flexing. The blade may be one long piece or be composed of a plurality of small in-line sections. The knife blade 28a is clamped in position by a bar 35. A closely-spaced (e.g. 5/16 inch) series of bolts 36 extending through bar 35 and blade 28a are turned down into threaded passages 40 in bar 32.

The bar 32 is secured to the cylindrical member 16 by means of bolts 44 which extend down through passages 46 in bar 32 located along the bar opposite the keyways 22 in member 16. The bolts are threaded into wedge-shaped nuts 48 (FIG. 2) positioned in the keyways 22. Before the bolts 44 are tightened down into their respective nuts 48, the fixture 26a can be slid around the circumference of member 16 to position it at the appropriate angle thereon. Following this, the bolts are tightened to securely lock the knife assembly portion 26a in position on cylindrical member 16.

The knife assembly section 26b is for the most part a mirror image of section 26a in that its thin, flexible, resilient knife blade 28b is secured to a longitudinal bar 54 by means of a retaining bar 55 clamped to bar 54 by a lengthwise series of bolts 56 extending through bar 55 and blade 28b and threaded into the bar 54. Bar 54 is adjustably fixed to member 16 by means of a lengthwise series of bolts 58 extending through the bar and turned down into wedge-shaped nuts 62 positioned in the keyways 22.

As best seen in FIG. 2, the two fixture sections 26a and 26b are positioned on the cylindrical member 16 so that the edges of the knife blades 28a and 28b are spaced approximately $\frac{1}{4}$ inch to $\frac{3}{8}$ inch on opposite sides of a center line A—A drawn between the axes of the two cylinders 10 and 12. Furthermore, both blades are arranged so that their edges lie in the same circle drawn about the axis of cylinder 10.

As shown in FIG. 1, the anvil cylinder 12 also comprises a cylindrical member 62 having reduced diameter ends 62a journaled by way of bearing units 64 in the machine side plates 14. Member 62, like member 16, is provided with a set of circumferential keyways 66 spaced along its length. A circular array of anvil assemblies, indicated generally at 68, are secured via these keyways to member 62, with the angular positions of assemblies 68 corresponding to those of the knife assemblies 26. Thus in the present example there are eight such anvil assemblies positioned approximately 45 degrees apart around the axis of anvil cylinder 12.

The illustrated cutter is arranged to sever bleed trims. Therefore, each anvil assembly 68 comprises a pair of sections 68a and 68b which are arranged to function as backups for a corresponding pair of knife blades 28a and 28b when that pair of blades is positioned in the nip between the two cylinders as shown in FIG. 2.

Each anvil section 68a comprises a rigid longitudinal block 72 whose undersurface 72a is contoured to conform to the surface of the cylindrical member 62. Block 72 is secured to that member by bolts 74 threaded into nuts 75 in circumferential keyways 76 in member 62. A rectangular anvil block 80 is positioned in a notch 82 in block 72 and is held in place by bolts 84 extending through block 72 and threaded into the underside of the anvil block.

Each anvil section 65b is a mirror image of section 68a except that its anvil block 80 has a lengthwise series of openings 86. These openings 86 accommodate a lengthwise series of pins 140 supported by a long strap 142 bolted to the block 54 in the knife assembly section 26b. The strap and pins are arranged so that when the knife assembly is in the nip between the two cylinders as seen in FIG. 2, the pins 140 project down between the knife blades 28a and 28b, pierce through the web travelling through the nip and project into the openings 86 in the anvil block 80. Thus the pins impale bleed trims severed from the web by the two blades and carry them out of the nip as the knife cylinder continues to rotate counterclockwise in the direction indicated by the arrow in FIG. 2.

After the trims have been carried away from the nip a sufficient distance, they are pushed off the ends of the pins by a reciprocating bar 146 having laterally extending teeth 146a projecting between the pins 140. The ends of the bar 146 are connected to a pair of blocks 148 (FIG. 1) on which are rotatively mounted small wheels 152. The wheels 152 are arranged to run in eccentric grooves 154 in stationary annular blocks 156 mounted at opposite sides of the machine frame. The eccentric grooves 154 are shaped so that the teeth 146a are retracted radially inward, i.e. away from the ends of the pins 140, at the location of the nip and elsewhere except when located in the vicinity of a hood (not shown) positioned near the cylinders. Otherwise, the teeth are urged beyond the ends of the pins so that they push off any trims impaled on the pins. Thereupon the trims are sucked out of the cutting apparatus by a vacuum maintained in the hood.

Also it will be appreciated that the strip removing pins 140 and ancillary parts can just as well be mounted on the anvil cylinder so that the trims are taken away around the anvil cylinder.

During the rolling in procedure, the bolts 36 and 56 that secure the resilient knife blades 28a and 28b to their respective supporting blocks are pretorqued with the blades set high. Then the cylinders are rotated to bring each pair of knife and anvil assemblies into the nip between the two cylinders as shown in FIG. 2. With their retaining bolts thus pretorqued, the knife blades engage their respective anvils and the blades are flexed. Each blade is formed, dimensioned and supported so that it has a spring rate which develops the required amount of force between the blade edge and the anvil at the instant of interference to cut web, e.g. 400 to 600 pounds per lateral inch for paper web. In a typical case, the blade-anvil interference might be on the order of a few thousandths of an inch. For example, a typical installation might employ blades having a spring rate of twenty thousand pounds per inch of deflection per inch of blade length and which deflect between two an three hundredths of an inch. Then the bolts 36 and 56 are fully torqued.

This same procedure is followed with all of the knife-anvil assembly pairs.

During normal operation of the cutter, the interference between the knife blades and the anvil bars as the cylinders rotate is accommodated by flexure of the blades. Since the blade-anvil spacings were preset as described above, a sufficient local force is always developed to sever the web travelling between the knife and anvil assemblies. At the same time, the flexing of the blades prevents the buildup of unduly high forces on the knife edges and thus the rapid knife wear that such forces would cause. Further the cutting forces do not impose undue stresses and strains on the machine frame, cylinders or other parts of the apparatus as is the case with conventional rotary cutters of this general type.

The flexible blades also enable the cutter to reliably remove bleed trim strips. Now, when the left-hand blade 28a in FIG. 2 engages its anvil bar, the interference between the two flexes and blade. However, no forces are transmitted via the machine frame to the other blade 28b that might upset the preset spatial relationship between that knife blade and its anvil bar and thereby cause a defective cut or excessive wear of the knife blade 28b. *The blade 28b* simply flexes as needed to achieve the proper interference between its edge and the anvil.

The knife assembly described herein also assures that the typical relationship between each knife blade and its anvil bar is not upset by vibrations produced by other machine parts in the apparatus. This is because the natural frequency of each blade is arranged to be appreciably higher than natural frequencies of the other vibrating machine parts. Thus, as the cylinders 10 and 12 vibrate toward each other the knife and anvil follow. Flexure of the blades 28a and 28b take up this relative movement without unduly increasing the knife-anvil contact force. Conversely, as the cylinders move away from each other, the blades flex outwardly to maintain knife-anvil contact without unduly reducing the contact force below the minimum force required to cut web. Moreover, this holds true at all machine speeds so that the reliability of the present apparatus is independent of machine speed.

It will be appreciated also that the flexures of the blades compensate for changes in the cylinder center-to-center distance due to thermally induced expansions of the machine parts after startup.

Further, instead of employing flexible and resilient knife blades, the blades themselves can be rigid and be mounted in resilient fixtures.

As seen from the foregoing then, the rotary cutting apparatus embodying the principles of this invention should suffer a minimum amount of down time due to excessively worn knife blades. Also the apparatus should cut single and multiple ply webs reliably at all machine speeds. Yet, since these improvements are gained simply from employing the resilient knives described above, the cost involved in obtaining these advantages is not excessive. Further, since the aforesaid knife assemblies can be installed on conventional rotary knife and anvil cylinders, existing machines in the field can be retrofitted with these assemblies at minimum cost.

It will thus be seen that the objects set forth above among those made apparent from the preceding description are effeciently attained and since certain changes may be made in the above construction without departing from the scope of the invention, it is intended that all matter contained in the above description or shown in the accompanying drawings be interpreted as illustrative and not in a limiting sense.

It is also to be understood that the following claims are intended to cover all of the generic and specific features of the invention herein described.

I claim:

1. A rotary web cutting apparatus comprising

A. supporting structure for machine parts,

B. a knife cylinder,

C. means for mounting at least one knife assembly including a pair of closely spaced knife blades on the knife cylinder for cutting transverse strips from web, D. an anvil cylinder, E. means defining at least one anvil surface on the anvil cylinder, F. means for rotatively mounting the two cylinders parallel to one another on said structure so that they are spaced apart to form a nip between them, G. means for rotating the cylinders in opposite directions so that each knife blade passing through the nip interferes with an anvil surface, and H. means for removing said strips from the vicinity of said blades, said removing means including (1) a lengthwise series of projections mounted on one of said cylinders, said projections projecting through the plane defined by the cutting edges of the blade pair when the blade pair is in the nip between the two cylidners so tht the projections impale web strips cut by said blade pair, (2) means defining a lengthwise series of recesses on the other cylinder disposed opposite said projections when the projections are in the nip between the two cylinders, said recesses being arranged to receive the portion of the projections extending through the web strips, and (3) means mounted on said one cylinder adjacent said projections for pushing said strips off said projections at a location out of the nip between the two cylinders.

2. The apparatus defined in claim 1 wherein the pushing means comprise

A. teeth extending between the projections, and

B. means for reciprocating said teeth in unison between a first position in which the teeth are retracted from the free ends of the projections to a second position in which said teeth project beyond the free ends of the projections.

3. The apparatus defined in claim 1 whrein each knife blade is flexible and resilient and has a spring rate that biases its knife blade edge against its anvil.

4. A rotary web cutting apparatus comprising

A. supporting structure for machine parts,

B. a knife cylinder,

C. means for mounting at least one flexible and resilient knife assembly on the knife cylinder, each knife assembly including a pair of closely spaced knife blades for cutting transverse strips from a web, D. an anvil cylinder, E. means defining at least one anvil surface on the anvil cylinder, F. means for rotatively mounting the two cylinders parallel to one another on said structure so that they are spaced apart to form a nip between them, G. means for rotating the cylinders in opposite directions so that each knife blade passing through the nip interferes with an anvil surface simultaneously along its entire length, each said knife blade being relatively thin and positioned in its assembly so that is has appreciable free length adjacent its cutting edge and is canted relative to a line perpendicular to its anvil surface at the instant of its interference with that surface, H. means for setting the relative positions of each knife blade on its anvil surface so that the knife assembly is flexed at the instant of interference between the blade and anvil surface to bias the entire length of the blade edge toward that surface with sufficient local force to cut simultaneously the entire width of web trained between the blade and anvil surface, I. means for physically removing said strips from the vicinity of said blades, said removal means including a lengthwise series of projections mounted on one of said cylinders, said projections projecting through the plane defined by the cutting edges of the blade pair when the blade pair is in the nip between the two cylinders so that the projections impale web strips cut by said blade pair, and J. means mounted on said one cylinder adjacent said projections for removing said strips from said projections at a location out of the nip between the two cylinders.

5. The apparatus defined in claim 4 and further including means defining a lengthwise series of recesses on the other cylinder disposed opposite said projections when the projections are in the nip between the two cylinders, said recesses being arranged to receive the portions of the projections extending through the web strips.

6. The apparatus defined in claim 4 wherein the pushing means comprise

A. teeth extending between the projections, and

B. means for reciprocating said teeth in unison between a first position in which the teeth are retracted from the free ends of the projections to a second position in which said teeth project beyond the free ends of the projections.

7. A rotary web cutting apparatus comprising

A. supporting structure for machine parts,

B. a knife cylinder,

C. means for mounting at least one flexible and resilient knife assembly on the knife cylinder, each knife assembly including a pair of closely spaced knife blades for cutting transverse strips from a web, D. an anvil cylinder, E. means defining at least one anvil surface on the anvil cylinder, F. means for rotatively mounting the two cylinders parallel to one another on said structure so that they are spaced apart to form a nip between them, G. means for rotating the cylinders in opposite directions so that each knife blade passing through the nip interferes with an anvil surface simultaneously along its entire length, each said knife blade being relatively thin and positioned in its assembly so that is has appreciable free length adjacent its cutting edge and is canted relative to a line perpendicular to its anvil surface at the instant of its interference with that surface, H. means for setting the relative positions of each knife blade on its anvil surface so that the knife assembly is flexed at the instant of interference between the blade and anvil surface to bias the entire length of the blade edge toward that surface with sufficient local force to cut simultaneously the entire width of web trained between the blade and anvil surface, I. means for physically removing said strips from the vicinity of said blades, said removal means including a lengthwise series of projections mounted on one of said cylinders, said projections projecting through the plane defined by the cutting edges of the blade pair when the blade pair is in the nip between the two cylinders so that the projections impale web strips cut by said blade pair, and J. means mounted on said one cylinder adjacent said projections for removing said strips from said projections at a location out of the nip between the two cylinders.

* * * * *

UNITED STATES PATENT AND TRADEMARK OFFICE
CERTIFICATE OF CORRECTION

PATENT NO. : 4,143,568

DATED : March 13,1979

INVENTOR(S) : John Cogswell

It is certified that error appears in the above-identified patent and that said Letters Patent are hereby corrected as shown below:

Col. 2, line 50, "espell" should be --expel--.

Col. 5, line 24, "0.060" should be --.060--.

Col. 7, line 14, "an" should be --and--.

Col. 8, line 46, "tht" should be --that--.

Col. 8, line 52, "portion" should be --portions--.

Col. 9, line 20, "is" should be --it--.

Col. 10, line 27, "is" should be --it--.

Signed and Sealed this

*Twenty-sixth* Day of *June 1979*

[SEAL]

*Attest:*

RUTH C. MASON
*Attesting Officer*

DONALD W. BANNER
*Commissioner of Patents and Trademarks*